United States Patent
Wilms et al.

(10) Patent No.: US 7,805,800 B2
(45) Date of Patent: Oct. 5, 2010

(54) WIPER BLADE

(75) Inventors: Christian Wilms, Koersel-Beringen (BE); Hubert Verelst, Tienen (BE); Hans Beelen, Herk de Stad (BE)

(73) Assignee: Robert Bosch GmbH, Stuttgart (DE)

( * ) Notice: Subject to any disclaimer, the term of this patent is extended or adjusted under 35 U.S.C. 154(b) by 981 days.

(21) Appl. No.: 11/597,303

(22) PCT Filed: Apr. 15, 2005

(86) PCT No.: PCT/EP2005/051665

§ 371 (c)(1),
(2), (4) Date: Nov. 22, 2006

(87) PCT Pub. No.: WO2005/115814

PCT Pub. Date: Dec. 8, 2005

(65) Prior Publication Data

US 2007/0240271 A1    Oct. 18, 2007

(30) Foreign Application Priority Data

May 28, 2004  (DE) .................. 10 2004 026 686
Oct. 22, 2004  (DE) .................. 10 2004 051 466

(51) Int. Cl.
  *B60S 1/38*  (2006.01)
(52) U.S. Cl. .................. 15/250.43; 15/250.452
(58) Field of Classification Search .......... 15/250.452, 15/250.453, 250.454, 250.44, 250.451, 250.43
See application file for complete search history.

(56) References Cited

U.S. PATENT DOCUMENTS

| 3,626,544 | A | * | 12/1971 | Lopez et al. | 15/250.361 |
| 3,879,794 | A | * | 4/1975 | Roberts, Jr. | 15/250.452 |
| 4,360,943 | A | * | 11/1982 | Thompson et al. | 15/250.454 |
| 4,442,566 | A | * | 4/1984 | Sharp | 15/250.454 |
| 4,679,276 | A | * | 7/1987 | Tomkin | 15/250.454 |
| 6,836,927 | B2 |  | 1/2005 | De Block et al. | |

FOREIGN PATENT DOCUMENTS

| DE | 100 25 710 | 8/2001 |
| DE | 101 13 680 | 9/2002 |
| DE | 102 45 693 | 4/2004 |

\* cited by examiner

*Primary Examiner*—Gary K Graham
(74) *Attorney, Agent, or Firm*—Michael Best & Friedrich LLP

(57) ABSTRACT

A wiper blade (10) comprising a rubber elastic wiper strip (12) into whose lateral longitudinal grooves resilient rails (18, 20) are inserted as support elements and laterally protrude from the longitudinal grooves, wherein the resilient rails (18, 20) are held together at their ends and are fixed relative to the wiper strip (12) in the longitudinal direction and support a terminal cap (24). It is proposed that the terminal caps (24) have detachable fixing means (34) that engage in a top strip (16) of the wiper strip (12), wherein the axial movability of the resilient rails (18, 20) relative to the wiper strip (24) is limited by the terminal caps.

19 Claims, 2 Drawing Sheets

ID
WIPER BLADE

BACKGROUND OF THE INVENTION

The invention starts with a wiper blade. A non-articulated wiper blade whose wiper strip is composed of an elastomer material and that has a spoiler on its upper side is known from DE 101 13 680 A1. Said spoiler can be directly formed on and be composed of the same material as the wiper strip or can be a separate component made of another suitable plastic. The spoiler can serve as a support element of the wiper blade by itself or along with resilient rails, which are inserted into lateral longitudinal grooves of the profile of the wiper strip. Placed on the ends of the wiper blade are caps, whose guide surfaces run in the longitudinal direction of the wiper blade and are adjacent with a small shoulder to the guide surface of the spoiler. They hold the wiper strip and the resilient rails together at the ends. In the center region of the wiper blade, a connecting device is fastened on the support element in a cutout of the spoiler according to the so-called sidelock system, in which the wiper arm runs laterally parallel to the wiper blade in the area of the connecting device. A so-called overlock system is also known, in which the wiper arm runs above the wiper blade in the area of the connecting device. The connecting device has two claws on each of its side parts, which laterally encircle and hold the resilient rails of the support element.

A so-called non-articulated wiper blade that has a rubber elastic wiper strip with a wiper lip is known from DE 100 25 710 A1. Provided between the wiper lip and a top strip are lateral longitudinal grooves, into which the resilient rails are inserted as a support element. These resilient rails are held together at their ends by bridge elements and a center connecting element. The bridge elements have an extension as a fixing means that extends in the longitudinal direction of the wiper strip with a projection directed at the top strip. During assembly the projection is bent in the direction of the top strip so that the projection engages in the top strip and the resilient rails are fixed relative to the wiper strip in the longitudinal direction. Finally, the bridge elements are covered with terminal caps.

SUMMARY OF THE INVENTION

According to the invention, the terminal caps of the wiper blade have detachable fixing means that engage in a top strip of the wiper strip, wherein the axial movability of the resilient rails relative to the wiper strip is limited by the terminal caps. The terminal caps, which are preferably injection molded parts made of plastic, are slid from the end onto the wiper strip and the resilient rails, whereby the resilient rails are guided into inner guide profiles of the terminal caps. The guide profiles are closed on the end-side front side so that the resilient rails are fixed relative to the terminal caps in the longitudinal direction by the closed fore parts. Since, as far as they are concerned, the terminal caps are fixed relative to the top strip of the wiper strip in the longitudinal direction by the detachable fixing means, the resilient rails are also fixed relative to the wiper strip via the terminal cap. Additional components are not required. As a result, along with reducing the multiplicity of parts, the work step to connect these components is also saved.

In an embodiment of the invention, each of the terminal caps have as a fixing means a flexible tongue that runs essentially parallel to the upper side of the top strip and said tongue has a locking nose on its underside that engages in the top strip in an assembled state. The flexible tongue is lifted when disassembling the terminal cap so that the locking nose disengages and the terminal cap can be pulled off of the wiper strip. So that the locking nose does not automatically detach in an assembled state, the flexible tongue is blocked expediently with a bar, which is guided into a recess of the terminal cap that points to the outer front side and in a locked position presses the flexible tongue with the locking nose against the top strip. During disassembly, the bars are first detached before the flexible tongue is lifted.

In order to facilitate series assembly, the bar in an unlocked position is connected to the terminal cap via at least one predetermined breaking point so that the terminal cap and the bar can be delivered expediently as one component for initial assembly, thereby reducing the multiplicity of parts of the wiper blade. In addition, incorrect assembly of the bar is precluded since it is in a pre-assembled position. During assembly, the connection is detached at the predetermined breaking point and the bar is slid into the locked position. Incorrect assembly of the terminal caps with respect to the wiper strip is also precluded since the outer shape and the inner guide profile of the terminal cap correspond to the contour of the wiper strip and/or a spoiler.

To further lock the resilient rails, said resilient rails can also have snap-in holes in the area of the terminal caps, into which snap-in pegs arranged on the underside of the flexible tongues engage. The locking nose and the snap-in pegs can be assigned to flexible tongues that are separated from one another, which, in terms of their spring characteristics, can be better adapted to the different tasks.

The terminal caps in accordance with the invention are very simple to disassemble. To do so, the bar is merely pulled out of the recess and namely so far that the flexible tongue lifts and the locking nose disengages. In this state, a worn-out wiper strip can be replaced, for example. The bar features several lateral gripping cavities in accordance with its embodiment of the invention in order to better grasp the bar for disassembly or assembly, particularly if it is hard to move because of deposited dirt or other environmental influences.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
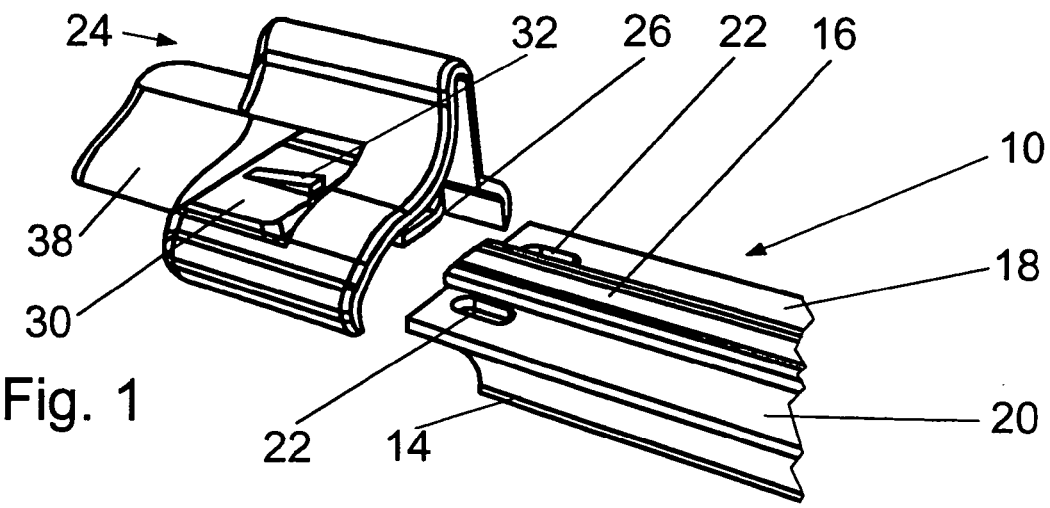
FIG. 1 A perspective partial view of an end of a wiper blade with a terminal cap in an exploded representation.

Only the parts of a non-articulated wiper blade 10 of a windshield wiper that are required to understand the invention are depicted (FIG. 1). The wiper blade 10 has a wiper strip 12 made of an elastomer material, whose lower side facing a windshield (not shown) is embodied as a wiper lip 14, while the upper side forms a top strip 16. In addition, the wiper blade 10 has a spoiler (not shown) above the top strip 16. In order to improve the spring characteristic of the wiper blade 10, it has two resilient rails 18 and 20 made of spring steel, which are inserted into lateral longitudinal grooves between the wiper lip 14 and the top strip 16 and serve as a support element. In an unstressed state, the resilient rails 18 and 20 have a greater curvature than the vehicle windshield and cause the wiper blade 10 to be adjacent to the vehicle windshield over the entire length under a defined application force and with a suitable distribution of pressure. The resilient rails 18 and 20 are held together on their ends in order to limit the relative movement between the wiper strip 12 and the resilient rails 18 and 20 in the longitudinal direction.

Figure 2:
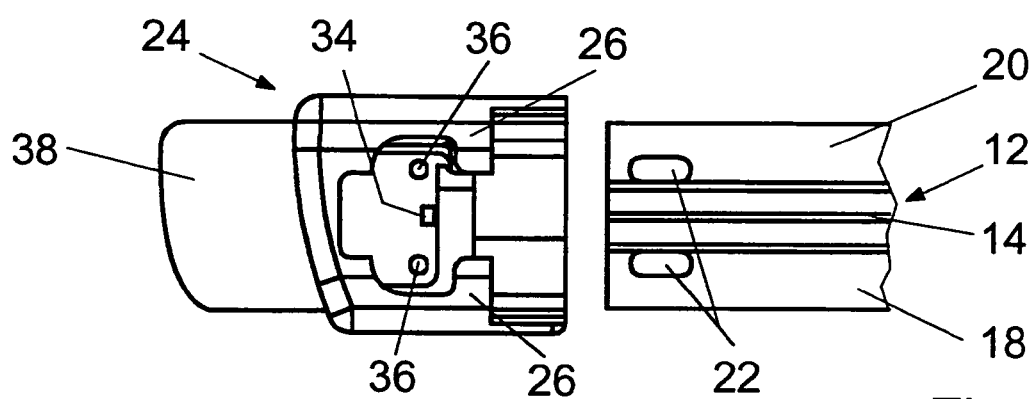
FIG. 2 A view from below of an end of the wiper blade according to FIG. 1.

A terminal cap 24 is provided on each of the ends of the wiper strip 12. The terminal cap 24 has an inner guide profile 26, which is formed respectively by two guide surfaces and connecting pieces that run parallel to the longitudinal direction of the wiper strip 12. Whereas the guide surfaces guide the terminal cap 24 on the longitudinal sides of the resilient rails 18 and 20 that project over the longitudinal grooves, the connecting pieces are supported on the lateral surfaces of the wiper strip 12 beneath the resilient rails 18 and 20 (FIG. 2). The terminal cap 24 is expediently an injection molded part made of plastic and has a formed-on and flexible tongue 30 that runs essentially parallel to the upper side of the top strip 16. The flexible tongue 30 has a locking nose 34 on its side that points towards the top strip 16. Said locking nose is designed to be wedge-shaped and increases in terms of its height toward the end, thereby facilitating assembly of the terminal cap 24. The flexible tongue 30 cooperates with a bar 38, which is guided into a recess 28 of the terminal cap 24 and in the locked position (FIG. 3) presses the flexible tongue 30 against the top strip 16 and blocks it. In doing so, the projection 34 engages in the top strip 16. With a rotating movement of the flexible tongue 30, the flank of the wedged-shaped locking nose 34 that faces the end raises up further so that the terminal cap 24 is secured against being pulled off. After detaching the bar 38, the flexible tongue 30 assumes its initial position again, whereby the locking nose 34 disengages with the aid of the elasticity of the top strip 16. In order to increase the pressure of the bar 38 on the flexible tongue 30, the flexible tongue 30 can have a wedge-shaped projection 32 on the side facing away from the locking nose 34, which projection diminishes in terms of height towards the end of the wiper strip 12.

In addition to the locking nose 34, the flexible tongue 30 can have two lateral and symmetrically arranged snap-in pegs 36, which in an assembled state engage in snap-in holes 22 that are arranged in the end region of the resilient rails 18 and 20 and serve as an additional guide. The snap-in holes 22 are embodied expediently as elongated holes so that the resilient rails 18, 20 have limited play in the longitudinal direction, which is required for the different curvatures of the wiper blade 10. In addition, the snap-in pegs 36 determine the distance of the resilient rails 18, 20 from one another. As a result, the connecting piece of the wiper strip 12 between the resilient rails has sufficient free space for good functionality.

Figure 3:
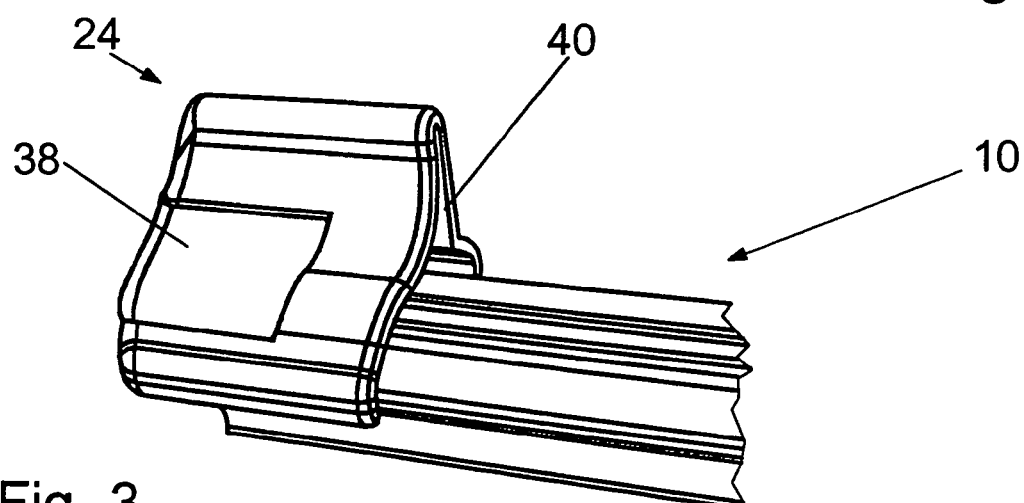
FIG. 3 A perspective partial view of an assembled terminal cap.
Figure 4:
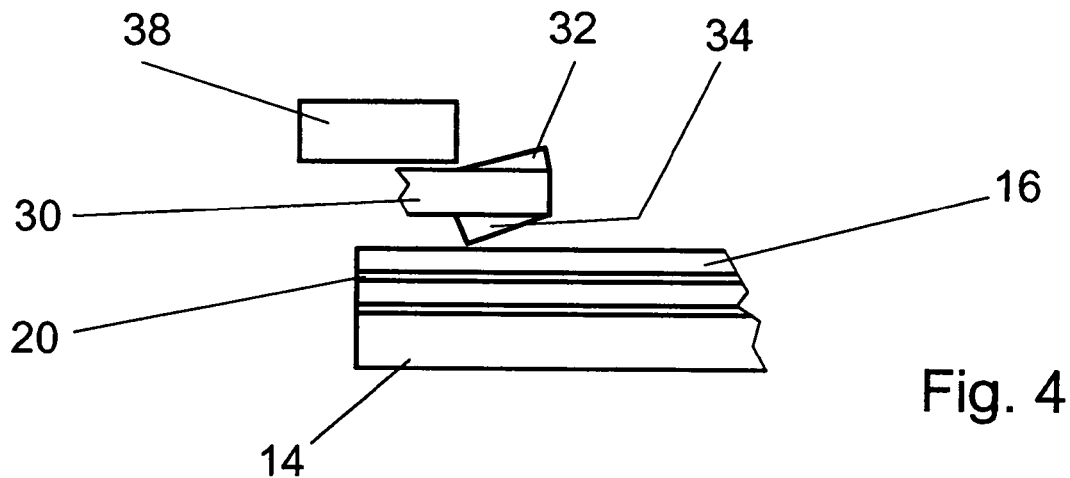
FIG. 4 A functional diagram of a wiper blade with locking elements of the terminal cap.

In an assembled state, the terminal cap 24 covers the end of the wiper blade 10 (FIG. 3). An aerodynamically favorable outer contour of the wiper blade 10 is created by the fact that the terminal cap is adjacent, positively engaged, to the spoiler with a connection profile 40. For assembly the terminal cap 24 is slid over the end of the wiper strip 12 with the pre-assembled resilient rails 18 and 20. In order to achieve precise positioning of the terminal cap 24 in the longitudinal direction of the wiper strip 12, the inner guide profiles 26 of one of their end-side front sides are closed. These bearing surfaces can be used as assembly limit stops. In an assembled state, the terminal cap 24 with its inner guide profile 26 that is coordinated precisely in terms of dimension and contour encircles the end of the wiper strip 12 and the resilient rails 18, 20 and detachably fixes the position of the parts relative to one another.

Figure 5:
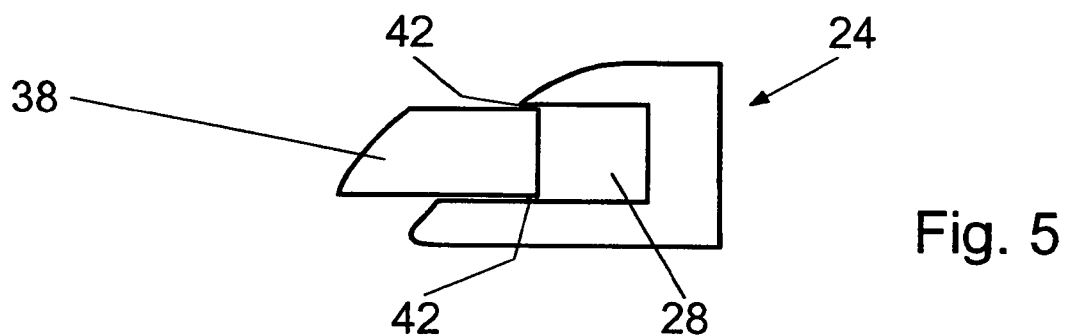
FIG. 5 A diagram of a terminal cap in a side view.

The bar 38 is arranged in a recess 28 pointing towards the outer front side of the terminal cap 24 and is connected to the terminal cap 24 before final assembly via predetermined breaking points 42, whereby advantageously only one component must be handled or the bar 38 cannot get lost in transport (FIG. 5). The predetermined breaking points 42 can be thin connecting pieces, pegs or film hinges. During final assembly, the predetermined breaking point 42 is detached and the bar 38 is slid into the recess 28 and over the flexible tongue 30 into a locked position.

Figure 6:
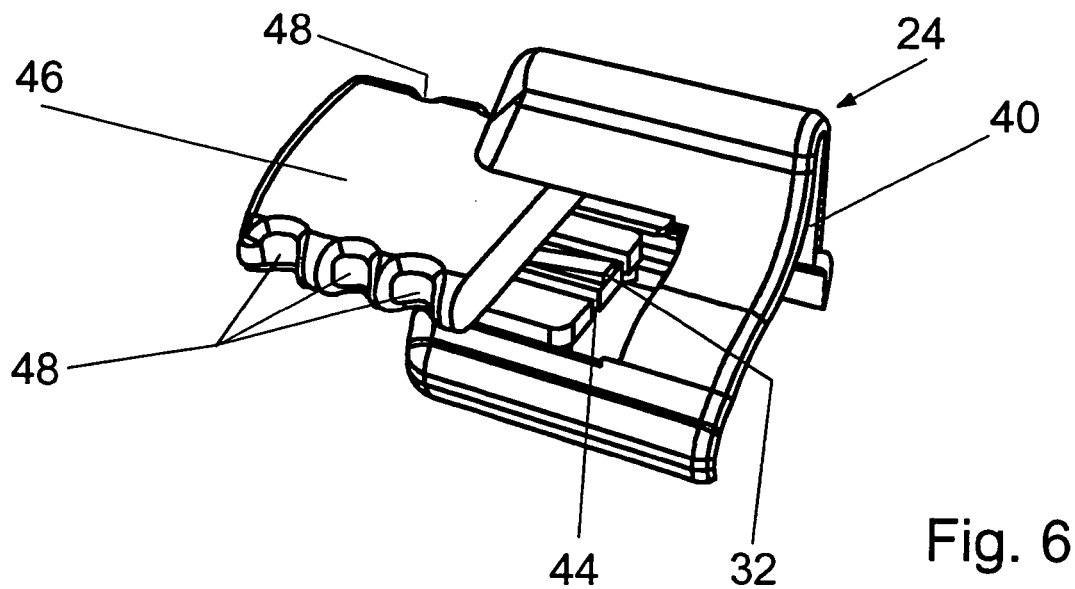
FIG. 6 A variation of a terminal cap according to FIG. 1.

In the case that a worn-out wiper strip 12, for example, is supposed to be replaced, the terminal cap 24, in accordance with the invention, can be removed in a simple way. To do so, the bar 38 is pulled out of the recess 28, thereby lifting the flexible tongue 30 and detaching the locking nose 34 from its lock. In order to simplify handling of the bar 38 during disassembly or assembly, one embodiment of the invention provides for a bar 46 with several lateral gripping cavities 48 (FIG. 6). In addition, the embodiment has a slotted flexible tongue 44. In this case, the wedge-shaped projection 32 and the locking nose 34 are arranged on the center part, while the outer parts of the flexible tongue 44 are provided for the snap-in pegs 36.

The invention claimed is:

1. Wiper blade (10) comprising a rubber elastic wiper strip (12) into whose lateral longitudinal grooves resilient rails (18, 20) are inserted as support elements, wherein the resilient rails (18, 20) have ends, are held together at the ends and are fixed relative to the wiper strip (12) in a longitudinal direction and support a terminal cap (24), wherein the terminal cap (24) has detachable fixing means (34) that engage in a top strip (16) of the wiper strip (12), wherein axial movability of the resilient rails (18, 20) relative to the wiper strip (24) is limited by the terminal cap, wherein the detachable fixing means (34) includes, on the terminal cap, a flexible tongue (30, 44) that runs essentially parallel to an upper side of the top strip (16) and said tongue has a locking nose (34) on its underside that engages in the top strip (16), and characterized in that the terminal cap (24) has a recess (28) pointing to an outer front side of the terminal cap, into which a bar (38, 46) is guided, which in a locked position presses the flexible tongue (30, 44) with its locking nose (34) against the top strip (16).

2. Wiper blade (10) according to claim 1, characterized in that the flexible tongue (30, 44) has a wedge-shaped projection (32) on its side facing the bar (38, 46), which diminishes in terms of its height in an opening direction of the bar (38, 46).

3. Wiper blade (10) according to claim 2, characterized in that the locking nose (34) increases in height in a wedge-shaped manner in the opening direction of the bar (38, 46).

4. Wiper blade (10) according to claim 2, characterized in that the bar (38, 46) is connected to the terminal cap (24) before final assembly via at least one predetermined breaking point (42).

5. Wiper blade (10) according to claim 2, characterized in that the flexible tongue (30) has snap-in pegs (36) on the side facing the resilient rails (18, 20), which engage in snap-in holes (22) of the resilient rails (18, 20).

6. Wiper blade (10) according to claim 2, characterized in that the locking nose (34) increases in height in a wedge-shaped manner in an opening direction of the bar (38, 46).

7. Wiper blade (10) according to claim 1, characterized in that the bar (38, 46) is connected to the terminal cap (24) before final assembly via at least one predetermined breaking point (42).

8. Wiper blade (10) according to claim 7, characterized in that the flexible tongue (30) has snap-in pegs (36) on the side facing the resilient rails (18, 20), which engage in snap-in holes (22) of the resilient rails (18, 20).

9. Wiper blade (10) according to claim 7, characterized in that the bar (46) has lateral gripping cavities (48).

10. Wiper blade (10) according to claim 1, characterized in that the bar (46) has lateral gripping cavities (48).

11. Wiper blade (10) according to claim 1, characterized in that the locking nose (34) increases in height in a wedge-shaped manner in the opening direction of the bar (38, 46).

12. Wiper blade (10) according to claim 1, characterized in that the flexible tongue (30) has snap-in pegs (36) on the side facing the resilient rails (18, 20), which engage in snap-in holes (22) of the resilient rails (18, 20).

13. Wiper blade (10) according to claim 1, characterized in that the bar (46) has lateral gripping cavities (48).

14. Wiper blade (10) comprising a rubber elastic wiper strip (12) into whose lateral longitudinal grooves resilient rails (18, 20) are inserted as support elements, wherein the resilient rails (18, 20) have ends, are held together at the ends and are fixed relative to the wiper strip (12) in a longitudinal direction and support a terminal cap (24), wherein the terminal cap (24) has detachable fixing means (34) that engage in a top strip (16) of the wiper strip (12), wherein axial movability of the resilient rails (18, 20) relative to the wiper strip (24) is limited by the terminal cap, wherein the detachable fixing means (34) includes, on the terminal cap, a flexible tongue (30, 44) that runs essentially parallel to an upper side of the top strip (16) and said tongue has a locking nose (34) on its underside that engages in the top strip (16), characterized in that the terminal cap (24) has a recess (28) pointing to an outer front side of the terminal cap, into which a bar (38, 46) is guided, which in a locked position presses the flexible tongue (30, 44) with its locking nose (34) against the top strip (16), and characterized in that the locking nose (34) increases in height in a wedge-shaped manner in an opening direction of the bar (38, 46).

15. Wiper blade (10) according to claim 14, characterized in that the bar (38, 46) is connected to the terminal cap (24) before final assembly via at least one predetermined breaking point (42).

16. Wiper blade (10) according to claim 14, characterized in that the flexible tongue (30) has snap-in pegs (36) on the side facing the resilient rails (18, 20), which engage in snap-in holes (22) of the resilient rails (18, 20).

17. Wiper blade (10) according to claim 14, characterized in that the bar (46) has lateral gripping cavities (48).

18. Wiper blade (10) comprising a rubber elastic wiper strip (12) into whose lateral longitudinal grooves resilient rails (18, 20) are inserted as support elements, wherein the resilient rails (18, 20) have ends, are held together at the ends and are fixed relative to the wiper strip (12) in a longitudinal direction and support a terminal cap (24), wherein the terminal cap (24) has detachable fixing means (34) that engage in a top strip (16) of the wiper strip (12), wherein axial movability of the resilient rails (18, 20) relative to the wiper strip (24) is limited by the terminal cap, wherein the detachable fixing means (34) includes, on the terminal cap, a flexible tongue (30, 44) that runs essentially parallel to an upper side of the top strip (16) and said tongue has a locking nose (34) on its underside that engages in the top strip (16), and characterized in that the flexible tongue (30) has snap-in pegs (36) on the side facing the resilient rails (18, 20), which engage in snap-in holes (22) of the resilient rails (18, 20).

19. Wiper blade (10) according to claim 18, characterized in that the bar (46) has lateral gripping cavities (48).

* * * * *